(12) United States Patent
Wolf

(10) Patent No.: US 12,540,076 B2
(45) Date of Patent: Feb. 3, 2026

(54) SYSTEMS, APPARATUS AND METHODS TO ACCELERATE GENERATION OF CHLORINE DIOXIDE GAS

(71) Applicant: Darrel George Wolf, Zeeland, ND (US)

(72) Inventor: Darrel George Wolf, Zeeland, ND (US)

( * ) Notice: Subject to any disclaimer, the term of this patent is extended or adjusted under 35 U.S.C. 154(b) by 933 days.

(21) Appl. No.: 17/367,307

(22) Filed: Jul. 2, 2021

(65) Prior Publication Data

US 2023/0002227 A1    Jan. 5, 2023

(51) Int. Cl.
*C01B 11/02* (2006.01)
(52) U.S. Cl.
CPC .................... *C01B 11/024* (2013.01)
(58) Field of Classification Search
CPC .................................................. C01B 11/024

USPC ......................................................... 422/225
See application file for complete search history.

(56) References Cited

FOREIGN PATENT DOCUMENTS

| CN | 209934566 U | * | 1/2020 |
| CN | 214343649 U | * | 10/2021 |

OTHER PUBLICATIONS

CN-209934566U (Year: 2024).*
CN-214343649U (Year: 2024).*

* cited by examiner

*Primary Examiner* — Huy Tram Nguyen
(74) *Attorney, Agent, or Firm* — Cygnet IP Law; Stephen W. Aycock, II

(57) ABSTRACT

Disclosed are systems, apparatus, and methods for accelerating the generation of chlorine dioxide gas by rotating a member such as a puck, tablet, or pouch of reactant such as sodium chlorite in an acidic solution that will cause and help accelerate a reaction to generate chlorine dioxide gas.

10 Claims, 7 Drawing Sheets

SYSTEMS, APPARATUS AND METHODS TO ACCELERATE GENERATION OF CHLORINE DIOXIDE GAS

FIELD

Some implementations generally relate to chlorine dioxide gas generators, and, more particularly, to a system, apparatus, and method for accelerating point-of-use generation of chlorine dioxide gas.

BACKGROUND

Chlorine dioxide gas and aqueous solution is an effective antimicrobial agent at a concentration as low as 0.1 ppm and over a wide pH range. It is thought to penetrate cell walls and cell membranes of an organism and react with vital amino acids in the cytoplasm of the cell to kill the organism. Unfortunately, chlorine dioxide is not stable during storage and can be explosive at high concentrations. As a result, chlorine dioxide gas is not produced and shipped under pressure. It must generally be generated on site using conventional chlorine dioxide generators or other means of generation.

Conventional chlorine dioxide generation can be carried out in connection with large-scale operations such as those in pulp and paper factories or water treatment facilities. In other applications, however, generating chlorine dioxide on site may not be a viable option. Conventional on-site chlorine dioxide generation can be costly, cumbersome, and difficult because of the need for a generator and the need to handle the generator and the chemicals associated with the generation process.

There are many known methods for generating chlorine dioxide, including both chemical and electrolytic processes. In the chemical processes, chlorine dioxide is typically generated by oxidizing chlorite or by reducing chlorate. These reactions often result in corrosive and/or potentially unsafe byproducts. Electrolytic processes typically generate chlorine gas to oxidize chlorite or generate a proton to reduce chlorates to chlorine dioxide. Although they achieve the desired end result of producing chlorine dioxide, these electrolytic cells can be very large in size and expensive. Electrolytic systems may also contain fragile ion separation membranes and may be too cumbersome for generating chlorine dioxide at the point of use.

These conventional technologies may be corrosive, contaminated with impurities, costly, or too slow in reaction rates for producing point of use products incorporating chlorine dioxide. Some conventional products also may use a membrane shell that water can absorb into with two compartments or two cavities, in which one compartment or cavity has sodium chlorite and the other has granulated acid. In these products, the two cavities or compartments are separated until the water absorbs into the membrane and the water activates the acid, the acid absorbs through the wall that separates the two chemicals to activate the sodium chlorite.

Although these conventional products make chlorine dioxide, they may be very inefficient. For example, if the water does not dissolve the acid at a good rate of time, more acid may need to be used. By using more acid, the conventional systems may become more corrosive and/or more toxic. The more acid a system uses, the more dangerous it becomes. Also, the amount of water and temperature of the water can make a different on how the acid flows into the sodium chlorite chamber. In general, the conventional devices and methods using two compartments are susceptible to premature activation by water, water vapor or ambient humidity and therefore may be dangerous and may have a reduced shelf life.

Dry compositions for generating chlorine dioxide solutions are known in the art. For example, U.S. Pat. No. 2,022,262, issued to White on Nov. 26, 1935, discloses stable stain-removing compositions made from a dry mixture of water-soluble alkaline chlorite salt, an oxalate and an acid. U.S. Pat. No. 2,071,091, issued to Taylor on Feb. 16, 1937, discloses the use of chlorous acid and chlorites to kill fungi and bacterial organisms by exposing the organisms to the compounds at a pH of less than about 7. The patent also discloses using dry mixtures of chlorites and acids to produce stable aqueous solutions useful as bleaching agents. U.S. Pat. No. 2,482,891, issued to Aston on Sep. 27, 1949, discloses stable, solid, substantially anhydrous compositions comprising alkaline chlorite salts and organic acid anhydrides which release chlorine dioxide when contacted with water.

Canadian Patent No. 959,238, issued to Callerame on Dec. 17, 1974, discloses using two water-soluble envelopes, one containing sodium chlorite and one containing an acid, to generate chlorine dioxide. The envelopes are placed in water and the sodium chlorite and acid dissolve in the water and react to produce a chlorine dioxide solution. U.S. Pat. No. 2,071,094, issued to Vincent on Feb. 16, 1937, discloses deodorizing compositions in the form of dry briquettes formed of a mixture of soluble chlorite, an acidifying agent, and a filler of relatively low solubility. Chlorine dioxide is generated when the briquettes contact water.

U.S. Pat. No. 4,585,482, issued to Tice et al. on Apr. 29, 1986, discloses a long-acting biocidal composition comprising a microencapsulated mixture of chlorite and acid that when added to water releases chlorine dioxide. The primary purpose of the microencapsulation is to provide for hard particles that will be free flowing when handled. The microencapsulated composition also protects against water loss from the interior of the microcapsule. The microcapsules produce chlorine dioxide when immersed in water. Unfortunately, the microcapsules release chlorine dioxide relatively slowly and therefore may not be suitable for applications that require the preparation of chlorine dioxide on a relatively fast basis.

PCT Application PCT/US98/22564 (WO 99/24356), published on May 20, 1999, discloses a method and device for producing chlorine dioxide solutions wherein sodium chlorite and an acid are mixed and enclosed in a semi-permeable membrane device. When the device is placed in water, water penetrates the membrane. The acid and sodium chlorite dissolve in the water and react to produce chlorine dioxide. The chlorine dioxide exits the device through the membrane into the water in which the device is immersed producing a chlorine dioxide solution that can be used as an antimicrobial solution or for other purposes. The primary disadvantage of this conventional device and method is that ambient moisture can penetrate the semi-permeable membrane and initiate the reaction prematurely.

In general, some conventional devices and methods using membranes may be susceptible to premature activation by water or water vapor and therefore have a reduced shelf life unless sufficient steps are taken to protect the devices from exposure to ambient moisture or water. Such conventional devices and methods are typically slow to interact with water and produce the desired chlorine dioxide. Also, in order to comply with U.S. Department of Transportation regulations and other regulations, some conventional devices may require special handling and shipping procedures that can be burdensome and/or costly. For example, if sodium chlorite and acid are packaged together, certain restrictions may apply.

As a result, there may be a need for systems, apparatus and methods to generate chlorine dioxide gas and/or an aqueous chlorine dioxide solution on-site that are relatively fast and that provide an extended shelf life compared to some conventional devices. Further, systems, apparatus and methods for producing chlorine dioxide gas that are not susceptible to activation by ambient moisture, and which form a chlorine dioxide gas or solution much more quickly than conventional devices, and that can be assembled and packaged in ways that help avoid stringent handling and shipping regulations may be needed.

SUMMARY

Some implementations improve the process of generating chlorine dioxide gas and aqueous solution for the purpose of microbial disinfection of meats, fruits, vegetables, and poultry, mold and allergy remediation, use as a disinfectant and oxidizer with bleaching, deodorizing, bactericidal, viricidal, algicidal and fungicidal properties. Other applications include sanitizing air ducts and HVAC/R systems and animal containment areas (e.g., walls, floors, and other surfaces). Chlorine dioxide gas is frequently used to control microorganisms on or around foods because it destroys the microorganisms without forming byproducts that pose a significant adverse risk to human health, e.g., chloramines and chlorinated organic compounds.

In order to avoid the difficulty of using conventional chlorine dioxide generators, the expense associated with handling and shipping stabilized chlorine dioxide solutions and related precursor solutions and the dangers associated with activating chlorine dioxide solutions, some implementations can include dry compositions containing chemicals (e.g., sodium chlorite) that react with acid solution to form chlorine dioxide. The compositions can be easily shipped to remote locations in dry form (e.g., sodium chlorite). The necessary acid solution can be added on site. For example, in an application where a disinfectant solution is needed to clean surfaces, a dry composition containing a metal chlorite and an acid solution can be mixed on site. Water can then be added which causes the components to react and produce an aqueous chlorine dioxide solution. The solution can then be used to disinfect the surfaces.

Some implementations can include a method for generating chlorine dioxide gas on-site. The method can include providing a chamber configured to hold liquid having a motor coupled to the chamber with a shaft coupled to the motor and extending into an area of the chamber configured to hold the liquid and attaching a sodium chlorite member to the shaft. The method can also include adding a liquid to the chamber, wherein once introduced to the chamber, the liquid is acidic, and activating the motor causing sodium chlorite member to rotate within the liquid to accelerate generation of chlorine dioxide gas.

In some implementations, the motor can be mounted to a top of the chamber. In some implementations, the motor can be mounted to a bottom of the chamber. In some implementations, the shaft connected to the motor includes a clip configured to clip to the sodium chlorite member. In some implementations, the shaft connected to the motor includes a basket or a holder with holes, wherein the basket or the holder is configured to hold the sodium chlorite member and the holes permit the liquid to flow though the holes to contact the sodium chlorite member when the motor is spinning.

In some implementations, the sodium chlorite member includes one of a tablet, a puck, or a pouch containing sodium chlorite. In some implementations, the sodium chlorite member is attached to the shaft via a clip. In some implementations, the sodium chlorite member is attached to the shaft via an interference fit between the shaft and an aperture in the sodium chlorite member.

Some implementations can include an apparatus for generating chlorine dioxide gas on-site. The apparatus can include a chamber configured to hold liquid having a motor coupled to the chamber with a shaft coupled to the motor and extending into an area of the chamber configured to hold the liquid, wherein the liquid includes an acid. The apparatus can also include an attachment mechanism coupled to the shaft and configured to attach to a sodium chlorite member. In some implementations, when the motor is activated, the attachment mechanism, via the shaft causes the sodium chlorite member to rotate within the acidic liquid to accelerate generation of chlorine dioxide gas.

In some implementations, the motor is mounted to a top of the chamber. In some implementations, the motor is mounted to a bottom of the chamber. In some implementations, the shaft connected to the motor includes a clip. In some implementations, the apparatus further comprises at least one of a USB cord or a battery to provide power to the apparatus.

In some implementations, the chamber includes holes near a top side of the chamber, wherein the holes are configured to release chlorine dioxide gas generated in the chamber. In some implementations, the shaft connected to the motor includes a basket or a holder with holes, wherein the basket or the holder is configured to hold the sodium chlorite member and the holes permit the liquid to flow though the holes to contact the sodium chlorite member when the motor is spinning.

In some implementations, the sodium chlorite member includes one of a tablet, a puck, or a pouch containing sodium chlorite. In some implementations, the sodium chlorite member is attached to the shaft via a clip. In some implementations, the sodium chlorite member is attached to the shaft via an interference fit between the shaft and an aperture in the sodium chlorite member.

Some implementations can include an apparatus for generating chlorine dioxide gas on-site. The apparatus can include a chamber configured to hold liquid having an air source coupled to the chamber with a tube extending from the air source into an area of the chamber configured to hold the liquid, wherein the liquid includes an acid. When the air source is activated, bubbles travel from the tube through the liquid to accelerate generation of chlorine dioxide gas. In some implementations, the tube is disposed near one of a top of the chamber or a bottom of the chamber.

A system and or device for speeding up the process for producing a gas chlorine dioxide is disclosed. An implementation can be any shape and can be constructed to hold liquid in a container so that the first device can mix the reactants using a motor (e.g., on the top of the apparatus or on the bottom of the apparatus), with a rod or shaft that extends from the motor. On a distal end of the rod or shaft a puck, pouch or tablet is attached that contains sodium chlorite. By attaching the puck, pouch, or tablet by attaching onto the rod or shaft from the motor, the motor is able to spin the puck, pouch or tablet in the liquid to activate the sodium chlorite and generate chlorine dioxide gas more quickly compared to nonmoving systems. The chlorine dioxide gas can pass through holes on the top side of the device.

If the sodium chlorite sits still in the liquid, it can take longer to produce chlorine dioxide compared to using a bubbler (e.g., on the bottom of the apparatus) to agitate the reactants and mix the liquid to speed up the process of generating chlorine dioxide ($ClO_2$). Without movement of the puck, pouch or tablet in the liquid, the process may take longer to create chlorine dioxide gas compared to an implementation that moves the puck, pouch or tablet in the liquid. By using an implementation of the disclosed subject matter in testing, the present inventor(s) have found that not moving the puck, pouch or tablet increases the time that it takes to active and finish making chlorine dioxide. Further, the size of the compartment one cavity will depend on how much liquid is needed to produce chlorine dioxide ($ClO_2$) gas.

By spinning the puck, pouch or tablet, or bubbling the liquid in the system or device, a faster chemical reaction is carried out that generates chlorine dioxide gas faster. The liquid can be an acid-water mixture or just water depending on the tablet, pouch, or puck being used. Placing the puck, pouch or tablet having sodium chlorite in contact with the liquid, the sodium chlorite will be activated. In another implementation, water dissolves an acid and then the sodium chlorite or a reducing chlorate will start producing choline dioxide. By spinning the puck, pouch or tablet or by bubbling liquid, the sodium chlorite produces chlorine dioxide at a faster rate. Whether to use an acid water mixture or just water depends on how much chlorine dioxide is desired for a particular application and how fast the generation of chlorine dioxide is desired or required for the application. The acid could be selected from a wide range of acid solutions and will depend on the application. For example, the acid can include sodium acid sulfate (regular or food grade), sodium persulfate, or citric acid (regular or food grade).

DETAILED DESCRIPTION

Figure 1:
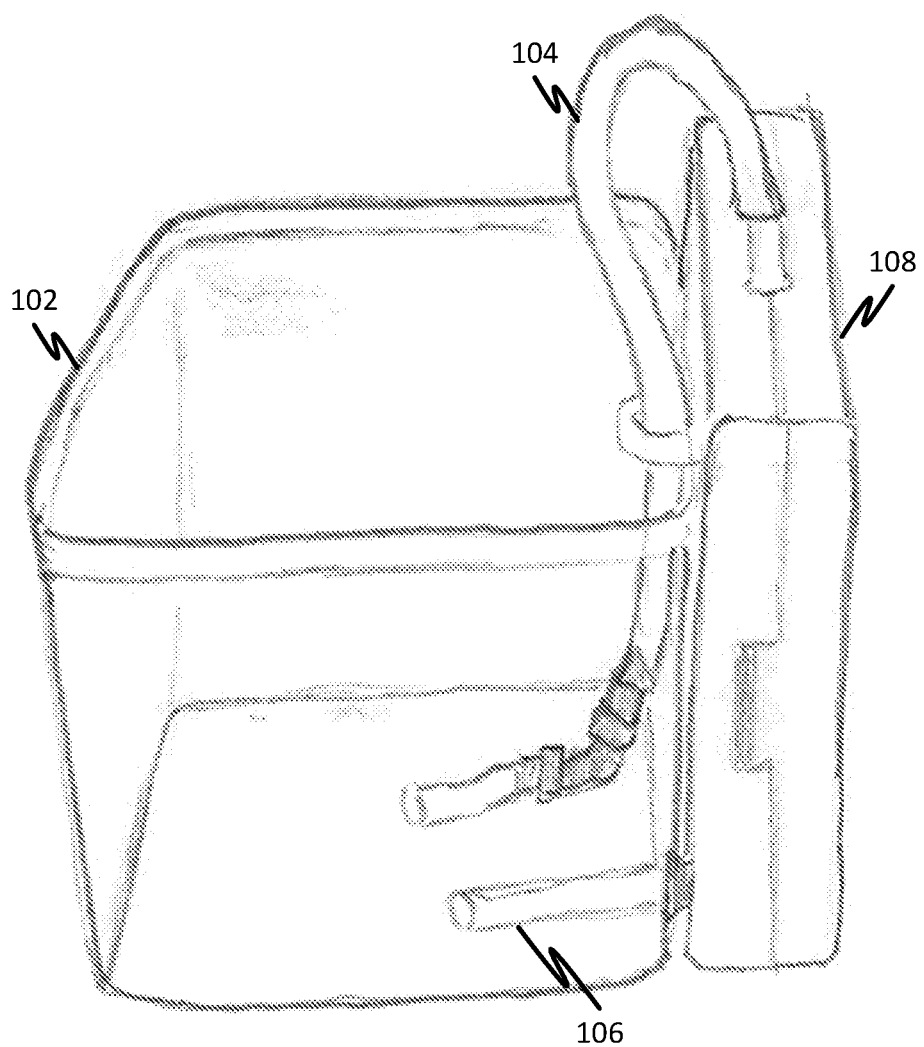
FIG. 1 is a diagram of an example chlorine dioxide generator including a tube or hose for air bubble agitation of reactants in accordance with some implementations.

In accordance with the disclosed subject matter, a system, apparatus, and method for accelerating generation of chlorine dioxide gas by exposing sodium chlorite to an acid or acid solution is provided. By putting the components into a system or device that can hold liquid in a container and that can attach a pouch, tablet or pouch to a rod that is attached to a motor that spins that has sodium chlorite in it that can spin it in a liquid so it will speed up the process of creating chlorine dioxide or a bubbler on the bottom of the device that will put air into the container so the liquid moves to speed up the process of producing chlorine dioxide ($ClO_2$). By spinning the puck, tablet or pouch, or bubbling, the liquid it will produce chlorine dioxide at a faster rate than not spinning or bubbling the liquid.

In a preferred embodiment, the compartment that holds the liquid can include a motor (top-mounted or bottom-mounted) with a shaft that can attach to a pouch, puck or tablet with sodium chlorite. The motor is configured to spin the pouch, puck or tablet in the liquid (e.g., acid solution or water). In other implementations, a bubbler can agitate, stimulate, or vibrate to accelerate the reaction and generation of chlorine dioxide. The chlorine dioxide gas flows out the opening of the system or device. The gas can be used, for example, to disinfect surfaces, deodorize, remediate mold, decontaminate surfaces, or as a topical skin or biological product for surface disinfecting. If needed, some systems and devices can include a fan or other device for circulating the chlorine dioxide gas that is generated.

An important advantage of the disclosed subject matter is that it can be modified to meet applicable shipping and handling regulations and may not require special handling procedures that can be cumbersome and/or expensive. Also, by accelerating the generation of chlorine dioxide gas, more parts per million (ppm) of chlorine dioxide can be supplied to an area (e.g., in a room) in a shorter period of time. And by producing more ppm of chlorine dioxide more quickly a user has a better chance of destroying organisms causing an odor and/or mold problem. By generating the gas more quickly, a user can accomplish a disinfectant or deodorizing task more quickly and efficiently.

If necessary or desirable, a user can use chlorine dioxide tables with an implementation of the disclosed subject matter. By placing the chlorine dioxide tablets in an implementation, the process of dissolving the tablets and producing chlorine dioxide gas can be accelerated. In other implementations, products from other suppliers can be utilized with an implementation of the disclosed subject matter to help those products form the other suppliers to create chlorine dioxide gas faster and more efficiently.

A system and or device for speeding up the process for producing a gases chlorine dioxide The system or device that can hold liquid in a container and that can spine the pouch, puck or tablet, or a bubbler on the bottom of the machine to agitate, stimulate bubble or vibrate the liquid to speed up the process of producing chlorine dioxide ($ClO_2$). The system or device can be made with any material as long as it can hold a liquid and by any means. The size of the compartment one cavity will depend on how much chlorine dioxide ($ClO_2$) is need for the application. Some implementations can speed up the production of chlorine dioxide gas from many different products as long as there is an acid present and sodium chlorite.

In some implementations, a user can use a chlorine dioxide tablet, pouch, or puck in a system or device implementation. The liquid that is in the system or device is spinning, agitating, vibrating, stimulating or bubbling will dissolve the table or capsule at a faster rate than if the tablet, pouch, or puck were simply sitting still in liquid that has acid dissolved in it or water that is not moving to dissolve the tablet or puck. Some implementations can include a pouch that as sodium chlorite in it and a pouch that has an acid in it and put it into the device. Some implementations can use a liquid that has the acid dissolved in it and then put the sodium chlorite in it via a rotating tablet, pouch, or puck.

FIG. 1 is a diagram of an example chlorine dioxide generator 100 including a tube or hose (104 and 106) for air bubble agitation of reactants in accordance with some implementations. FIG. 1 shows a tube or hose 104 coming from the top or it can come from the bottom 106 of the bubbler 108 this will agitate the liquid to stimulate and speed up the chemical reaction. The bubbler can be attached to the device or setting beside the liquid container 102 or can be integrated into the liquid container 102.

Figure 2:
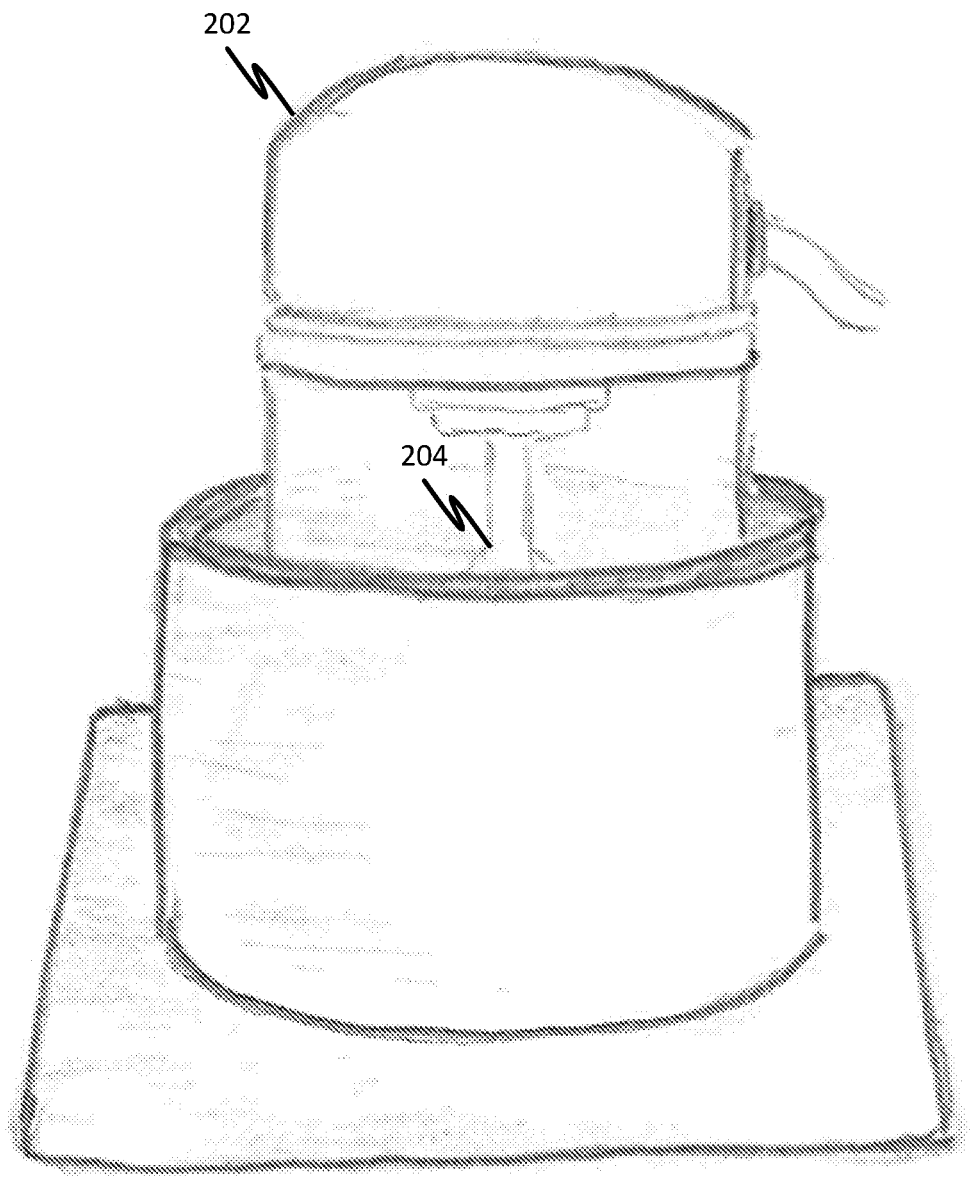
FIG. 2 is a diagram of an example chlorine dioxide generator having a motor on top of the device in accordance with some implementations.

FIG. 2 is a diagram of an example chlorine dioxide generator 200 having a motor 202 on top of the generator 200 with a shaft 204 coupled to the motor and configures to rotate a sodium chlorite member in a liquid within the chamber 206.

Figure 3:
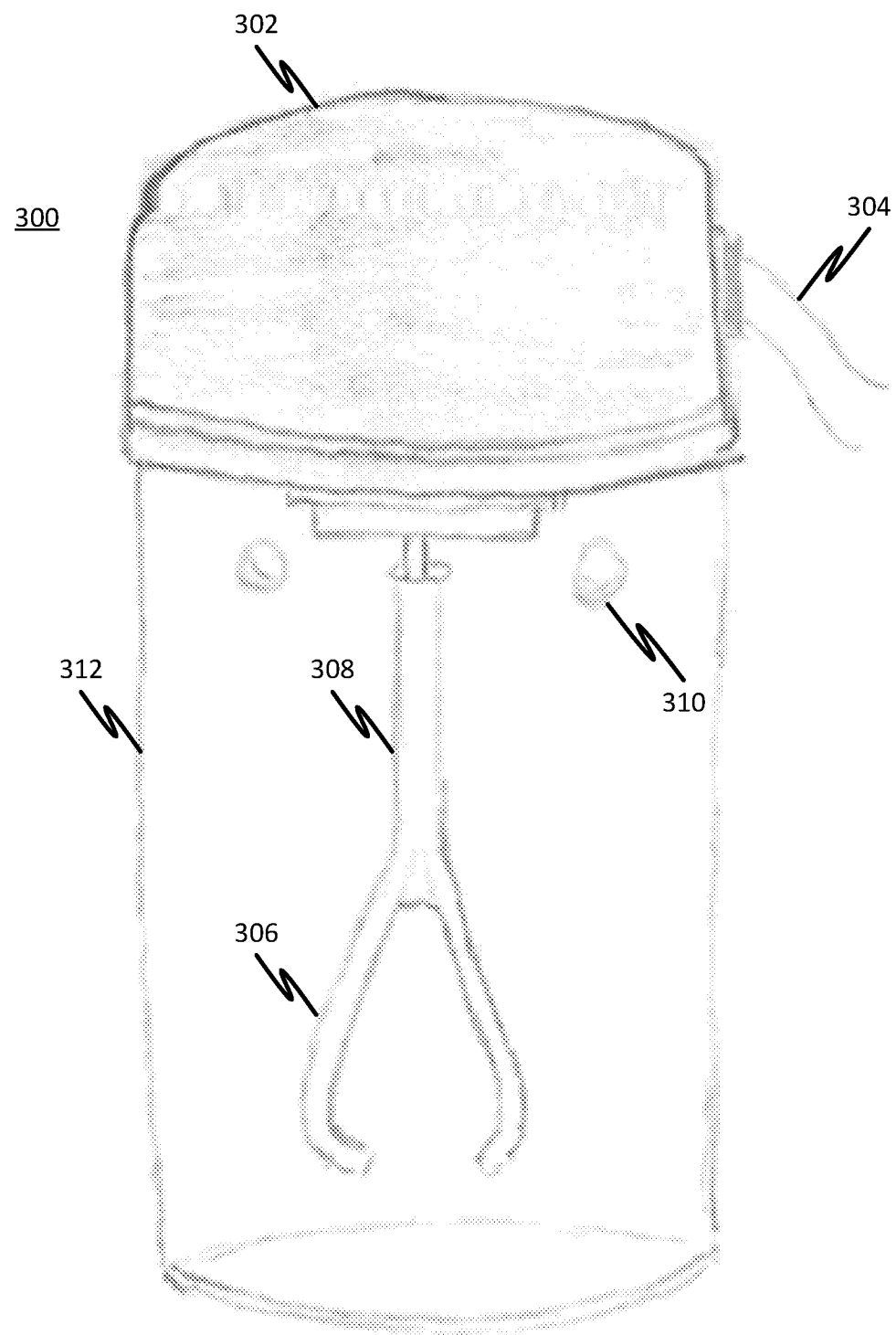
FIG. 3 is a diagram of an example chlorine dioxide generator having a cord to plug it in to a USB plugin to charge the batteries and a clip on the shaft to hold the pouch, tablet or puck so it can spin in accordance with some implementations.

FIG. 3 is a diagram of an example chlorine dioxide generator 300 having a top-mounted motor assembly 302 (including a motor and optional batteries and drive circuit for the motor) and a cord 304 to plug motor assembly 302 into a USB plugin or other power source to charge the batteries (or power the motor). FIG. 3 also shows a clip 306 on a shaft 308 to hold the sodium chlorite containing member (e.g., pouch, tablet or puck, etc.) so it can spin in acidic liquid contained in the chamber 312. The chlorine dioxide generator 300 also includes vent holes 310 to release the generated chlorine dioxide gas.

Figure 4:
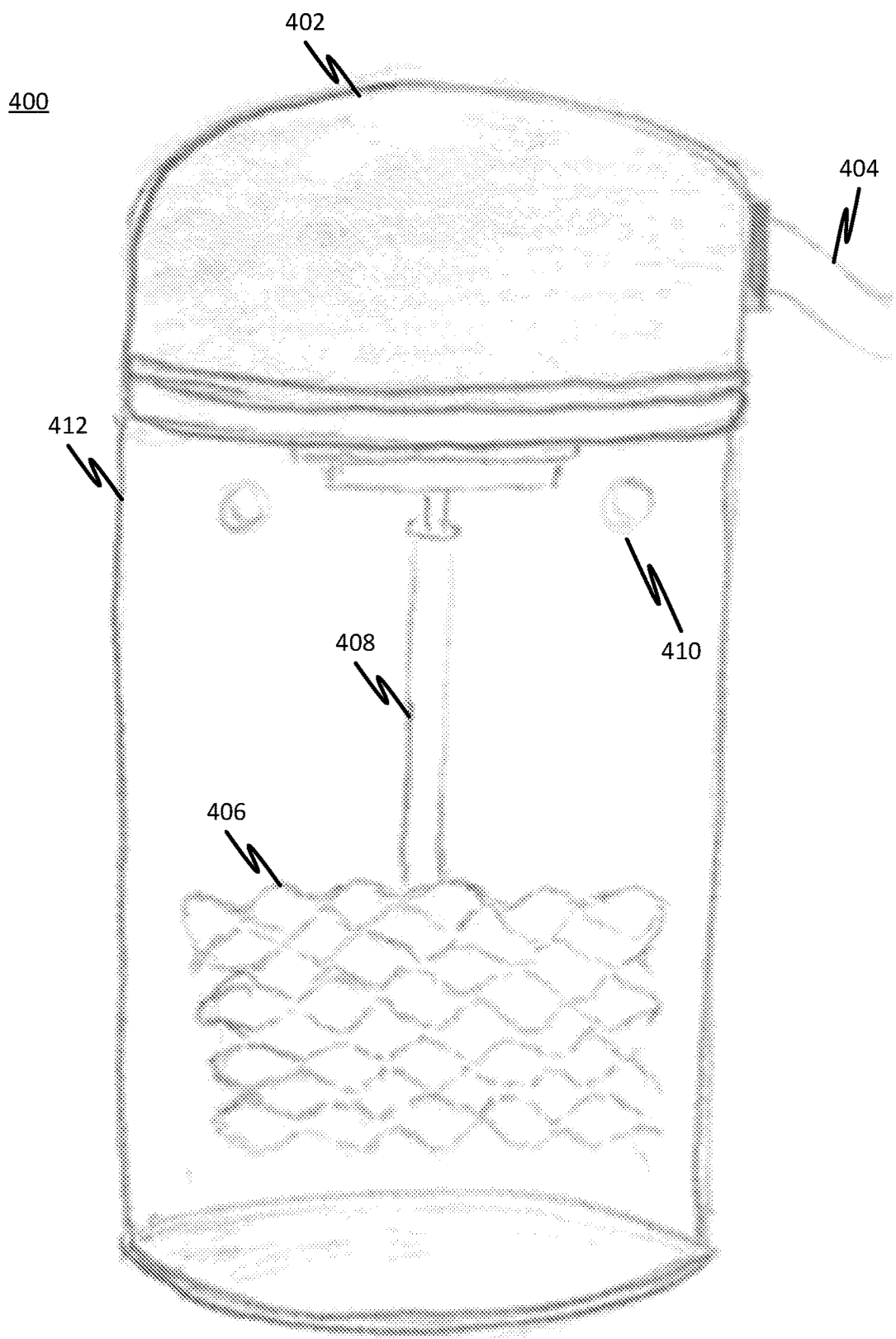
FIG. 4 is a diagram of an example chlorine dioxide generator having top-mounted motor and a wide clip to hold the pouch, tablet, or puck so it can spin in accordance with some implementations.

FIG. 4 is a diagram of an example chlorine dioxide generator 400 having a top-mounted motor assembly 402 (including a motor and optional batteries and drive circuit for the motor) and a cord 404 to plug motor assembly 402 into a USB plugin or other power source to charge the batteries (or power the motor). FIG. 4 also shows a holder or basket 406 on a shaft 408 to hold the sodium chlorite containing member (e.g., pouch, tablet or puck, etc.) so it can spin in acidic liquid contained in the chamber 412. The chlorine dioxide generator 400 also includes vent holes 410 to release the generated chlorine dioxide gas.

Figure 5:
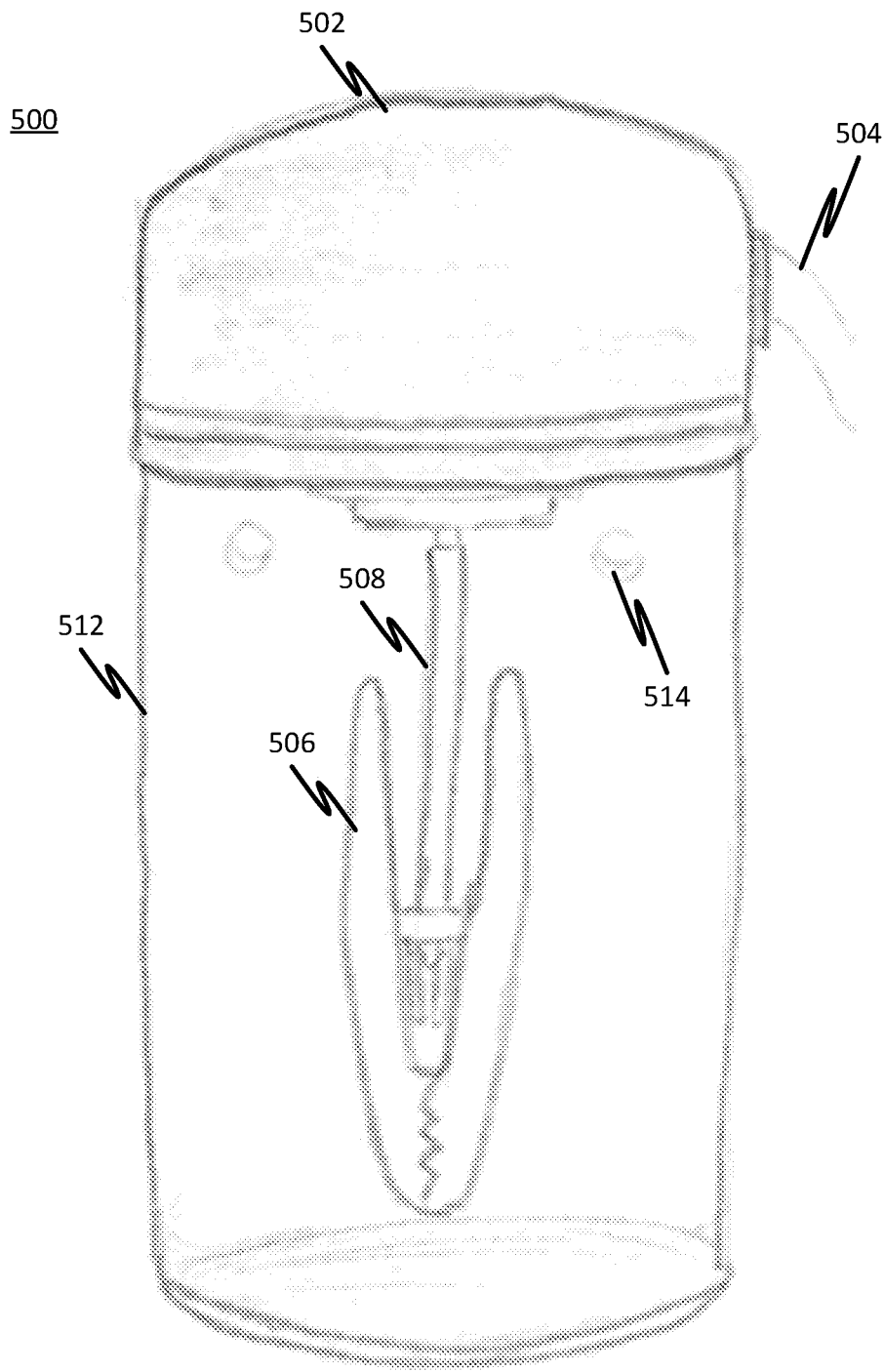
FIG. 5 is a diagram of an example chlorine dioxide generator having a top-mounted motor and a cage or holding device on the shaft with holes to hold the pouch, tablet or puck so it can spin in accordance with some implementations.

FIG. 5 is a diagram of an example chlorine dioxide generator 500 having a top-mounted motor assembly 502 (including a motor and optional batteries and drive circuit for the motor) and a cord 504 to plug motor assembly 502 into a USB plugin or other power source to charge the batteries (or power the motor). FIG. 5 also shows a clip 506 on a shaft 508 to hold the sodium chlorite containing member (e.g., pouch, tablet or puck, etc.) so it can spin in acidic liquid contained in the chamber 512. The chlorine dioxide generator 500 also includes vent holes 510 to release the generated chlorine dioxide gas.

Figure 6:
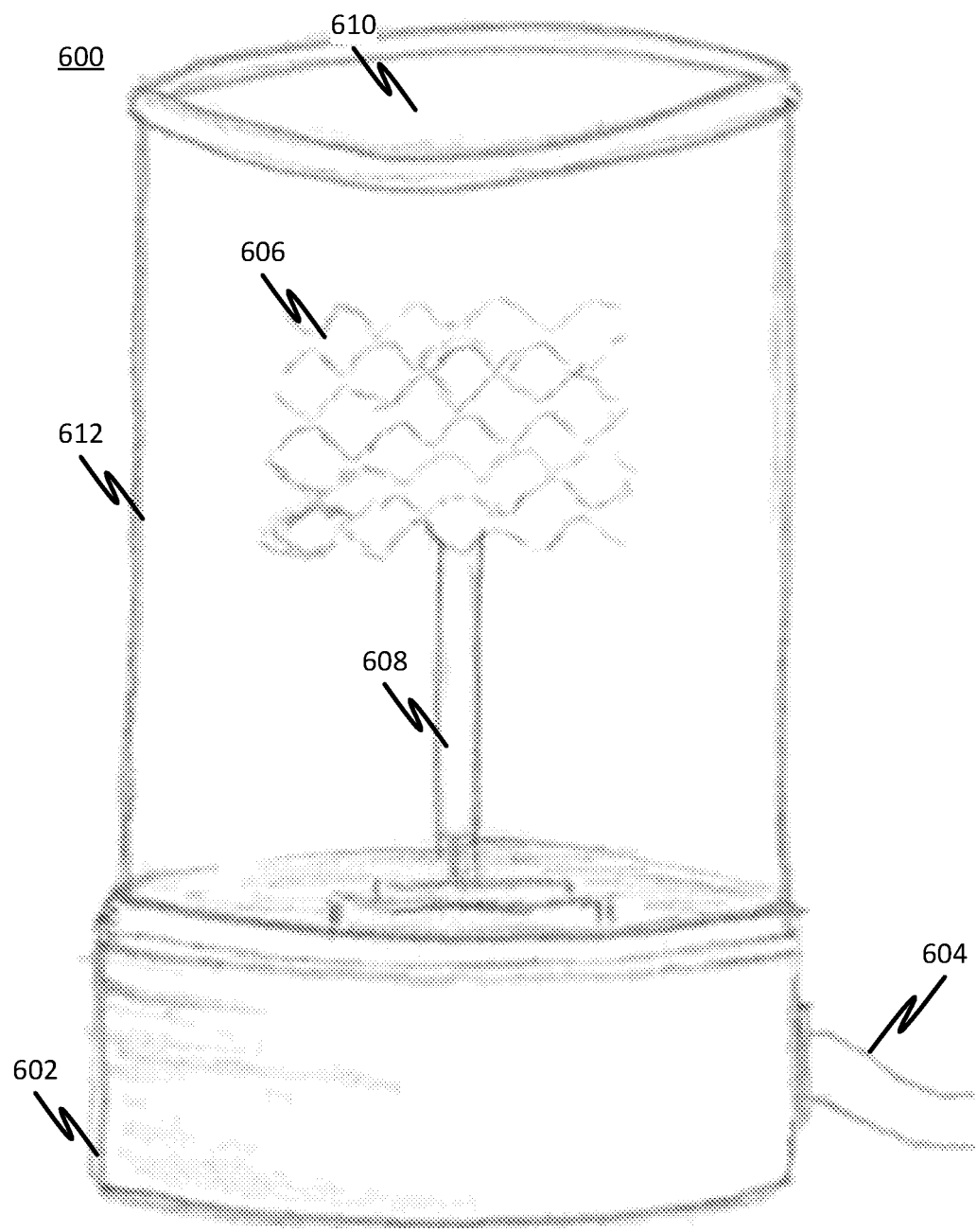
FIG. 6 is a diagram of an example chlorine dioxide generator having a bottom mounted motor and a wide clip to hold the pouch, tablet, or puck so it can spin in accordance with some implementations.

FIG. 6 is a diagram of an example chlorine dioxide generator 600 having a bottom-mounted motor assembly 602 (including a motor and optional batteries and drive circuit for the motor) and a cord 604 to plug motor assembly 602 into a USB plugin or other power source to charge the batteries (or power the motor). FIG. 6 also shows a holder or basket 406 on a shaft 608 to hold the sodium chlorite containing member (e.g., pouch, tablet or puck, etc.) so it can spin in acidic liquid contained in the chamber 612. The chlorine dioxide generator 600 also includes vent holes 610 to release the generated chlorine dioxide gas.

Figure 7:
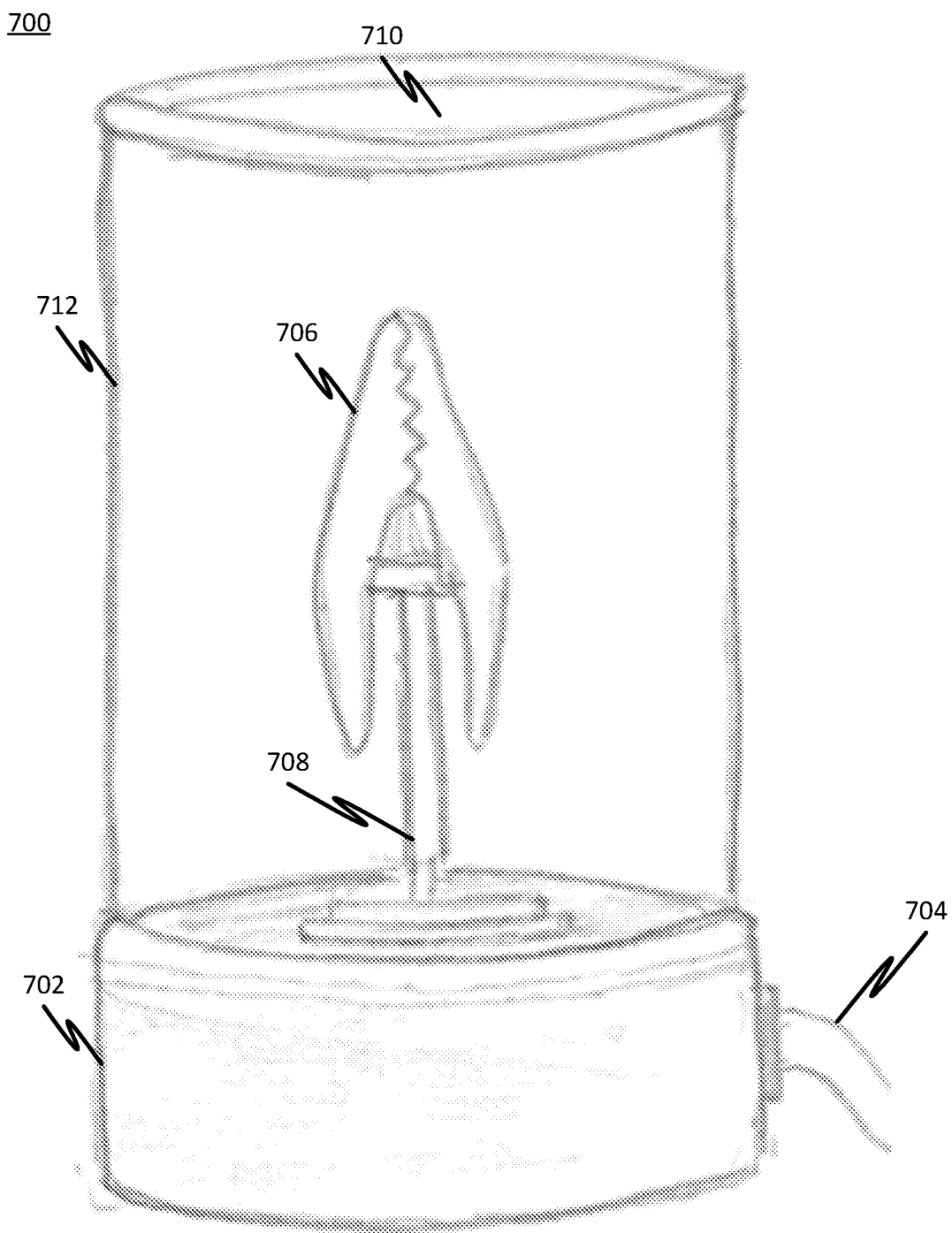
FIG. 7 is a diagram of an example chlorine dioxide generator having a bottom mounted motor and a cage or holding device on the shaft with holes to hold the pouch, tablet or puck so it can spin in accordance with some implementations.

FIG. 7 is a diagram of an example chlorine dioxide generator having a bottom-mounted motor assembly 702 (including a motor and optional batteries and drive circuit for the motor) and a cord 704 to plug motor assembly 702 into a USB plugin or other power source to charge the batteries (or power the motor). FIG. 7 also shows a clip 706 on a shaft 708 to hold the sodium chlorite containing member (e.g., pouch, tablet or puck, etc.) so it can spin in acidic liquid contained in the chamber 712. The chlorine dioxide generator 700 also includes vent holes 710 to release the generated chlorine dioxide gas.

In any of the examples shown in FIGS. 2-7, a configuration can be constructed in which the clip or holder can is absent, and the shaft can be inserted into the sodium chlorite member and secured via an interference fit with an aperture in the sodium chlorite member.

The sodium chlorite member can include a puck, table, pouch (e.g., a permeable material that permits liquids to flow through the pouch and contact the sodium chlorite within the pouch), a sponge impregnated with sodium chlorite, a dissolvable material that encapsulates or is impregnated with sodium chlorite, or the like.

It is contemplated that any optional feature of the variations described may be set forth and claimed independently, or in combination with any one or more of the features described herein. Reference to a singular item, includes the possibility that there is a plurality of the same item present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

Without the use of such exclusive terminology, the term "comprising" in the claims shall allow for the inclusion of any additional element irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

The breadth of the disclosed subject matter is not to be limited to the examples provided. It should be recognized that the disclosed subject matter includes variations explicitly or implicitly described herein. Further, it is not intended that any section of this specification (e.g., Summary, Detailed Description, Abstract, Field, etc.) be accorded special significance in disclosing the subject matter. All references cited herein are incorporated by reference in their entirety. Although the foregoing subject matter has been described in detail for purposes of clarity of understanding, it is contemplated that certain modifications may be practiced within the scope of the disclosed subject matter.

What is claimed is:

1. An apparatus for generating chlorine dioxide gas on-site, the apparatus comprising:

a chamber configured to hold liquid having a motor coupled to the chamber with a shaft coupled to the motor and extending into an area of the chamber configured to hold the liquid, wherein the liquid includes an acid; and an attachment mechanism coupled to the shaft and configured to a sodium chlorite member, wherein, when the motor is activated, the attachment mechanism, via the shaft causes the sodium chlorite member to rotate within the liquid to accelerate generation of chlorine dioxide gas.

2. The apparatus of claim 1, wherein the motor is mounted to a top of the chamber.

3. The apparatus of claim 1, wherein the motor is mounted to a bottom of the chamber.

4. The apparatus of claim 1, wherein the shaft connected to the motor includes a clip.

5. The apparatus of claim 1, further comprising at least one of a USB cord or a battery to provide power to the apparatus.

6. The apparatus of claim 1, wherein the chamber includes holes near a top side of the chamber, wherein the holes are configured to release chlorine dioxide gas generated in the chamber.

7. The apparatus of claim 1, wherein the shaft connected to the motor includes a basket or a holder with holes, wherein the basket or the holder is configured to hold the sodium chlorite member and the holes permit the liquid to flow though the holes to contact the sodium chlorite member when the motor is spinning.

8. The apparatus of claim 1, wherein the sodium chlorite member includes one of a tablet, a puck, or a pouch containing sodium chlorite.

9. The apparatus of claim 1, wherein the sodium chlorite member is attached to the shaft via a clip.

10. The apparatus of claim 1, wherein the sodium chlorite member is attached to the shaft via an interference fit between the shaft and an aperture in the sodium chlorite member.

* * * * *